United States Patent
Qiu et al.

(10) Patent No.: US 9,130,916 B2
(45) Date of Patent: Sep. 8, 2015

(54) CROSS-DOMAIN IDENTITY MANAGEMENT FOR A WHITELIST-BASED ONLINE SECURE DEVICE PROVISIONING FRAMEWORK

(75) Inventors: Xin Qiu, San Diego, CA (US); Ting Yao, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 569 days.

(21) Appl. No.: 13/087,843

(22) Filed: Apr. 15, 2011

(65) Prior Publication Data

US 2011/0258454 A1  Oct. 20, 2011

Related U.S. Application Data

(60) Provisional application No. 61/324,571, filed on Apr. 15, 2010.

(51) Int. Cl.
    H04L 29/06 (2006.01)
(52) U.S. Cl.
    CPC ............. H04L 63/08 (2013.01); H04L 63/10 (2013.01)
(58) Field of Classification Search
    CPC ............................... H04L 63/08; H04L 63/10
    USPC .......................................................... 713/176
    See application file for complete search history.

(56) References Cited

U.S. PATENT DOCUMENTS 6,192,130 B1 * 2/2001 Otway ........................ 380/277
8,078,180 B2 * 12/2011 Torres et al. ................ 455/445
2002/0164035 A1 * 11/2002 Yokota et al. ............... 380/278
2005/0154913 A1 * 7/2005 Barriga et al. .............. 713/201
2005/0249219 A1 * 11/2005 Bajko et al. ............... 370/395.3
2007/0083757 A1 * 4/2007 Nakano et al. .............. 713/168
2008/0130898 A1 * 6/2008 Holtmanns et al. ........ 380/278

FOREIGN PATENT DOCUMENTS

WO  WO 2007124218 A2 * 11/2007
WO  WO 2011130711 A2 * 10/2011

OTHER PUBLICATIONS

J. Rosenberg et al. "RFC 3840: Indicating User Agent Capabilities in the Session Initiation Protocol (SIP)" ©2004 The Internet Society (36 pages) http://www.ietf.org/rfc/rfc3840.txt.pdf.*

* cited by examiner

*Primary Examiner* — Joseph P Hirl
*Assistant Examiner* — Thomas Gyorfi
(74) *Attorney, Agent, or Firm* — Fox Rothschild LLP

(57) ABSTRACT

A method for managing identifiers associated with network-enabled devices and used in an identity data system provisioning the network-enabled devices with identity data includes receiving a first set data that includes a previously assigned identifier for one or more of the network-enabled devices that are authorized to be provisioned with new identity data. If identity data is currently installed on the one or more network-enabled devices, each of the previously assigned identifiers in the first set of data is associated with a corresponding identifier linked to the identity data currently installed on the one or more network-enabled devices to establish a second set of data. New identity data is bound to each of the one or more network-enabled devices by assigning a new identifier linked with the new identity data to each of the one or more network-enabled devices to establish a whitelist. The whitelist specifies, for each of the one or more network-enabled devices, its previously assigned identifier, its corresponding identifier and its new identifier that is linked with the new identity data.

27 Claims, 13 Drawing Sheets

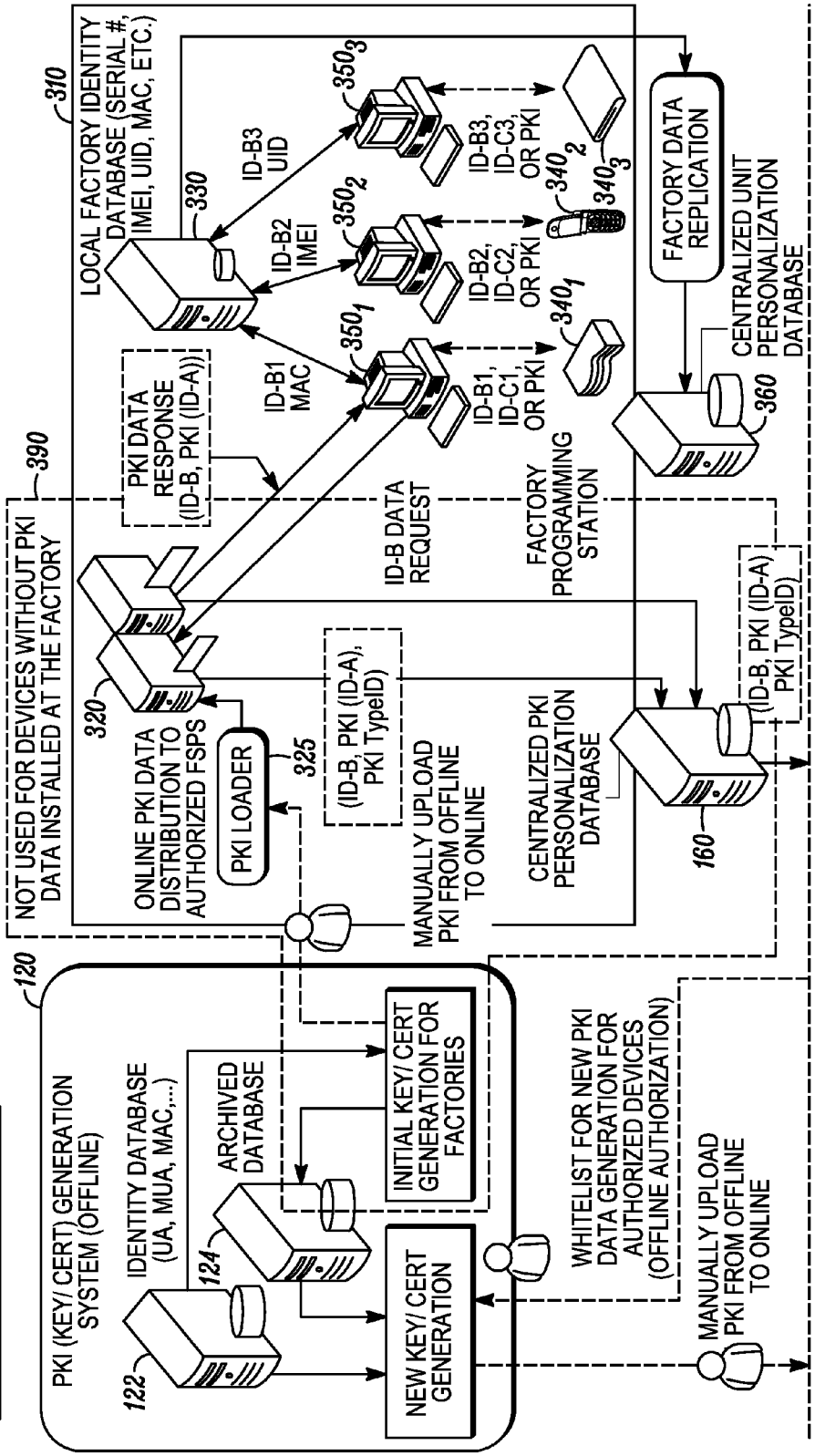

EXAMPLE WHITELIST FORMAT

| CustID | NEW PKIType ID 1 | ...... | NEW PKIType ID n |
|---|---|---|---|
| | PREV PKIType ID | | |
| | PREVIOUS ID 1 | | DEVICE ID 1 (ID-C1) |
| | PREVIOUS ID 2 | | DEVICE ID 2 (ID-C2) |
| | PREVIOUS ID 3 | | DEVICE ID 3 (ID-C3) |

*FIG. 2*

WHITELIST FOR DEVICES WITHOUT INITIAL PKI DATA (EXAMPLE)

| CustID | NEW PKIType ID 1 | ...... | NEW PKIType ID n |
|---|---|---|---|
| | ZERO | | |
| | UNSPECIFIED | | DEVICE ID 1 (ID-C1) |
| | UNSPECIFIED | | DEVICE ID 2 (ID-C2) |
| | UNSPECIFIED | | DEVICE ID 3 (ID-C3) |

NON-PKI BASED AUTHENTICATION USED BY OPUS

PROVIDED BY A NETWORK OPERATOR FOR THEIR DEPLOYED DEVICES

*FIG. 3A*

AFTER BINDING WITH NEW PKI DATA

ID-D IS LINKED TO CERTIFICATE OF THE NEW PKI DATA

| CustID | NEW PKIType ID 1 | DEVICE ID 1 (ID-C1) | NEW ID 1 (ID-D1) | NEW PKI DATA 1 |
|---|---|---|---|---|
| UNSPECIFIED | | DEVICE ID 2 (ID-C2) | NEW ID 2 (ID-D2) | NEW PKI DATA 2 |
| UNSPECIFIED | | DEVICE ID 3 (ID-C3) | NEW ID 2 (ID-D3) | NEW PKI DATA 3 |
| UNSPECIFIED | | | | |

THE SAME ID COULD BE USED FOR DIFFERENT TYPES

| CustID | NEW PKIType ID n | DEVICE ID 1 (ID-C1) | NEW ID 1 (ID-DX) | NEW PKI DATA X |
|---|---|---|---|---|
| UNSPECIFIED | | DEVICE ID 2 (ID-C2) | NEW ID 2 (ID-DY) | NEW PKI DATA Y |
| UNSPECIFIED | | DEVICE ID 3 (ID-C3) | NEW ID 2 (ID-DZ) | NEW PKI DATA Z |
| UNSPECIFIED | | | | |

*FIG. 3B*

AFTER BINDING WITH NEW PKI DATA

ID-D IS LINKED TO CERTIFICATE
OF THE NEW PKI DATA

| CustID | NEW PKIType ID 1 | DEVICE ID 1 (ID-C1) | NEW ID 1 (ID-D1) | NEW PKI DATA 1 |
|---|---|---|---|---|
| PREVIOUS ID 1 (ID-A1) | | DEVICE ID 2 (ID-C2) | NEW ID 2 (ID-D2) | NEW PKI DATA 2 |
| PREVIOUS ID 2 (ID-A2) | | DEVICE ID 3 (ID-C3) | NEW ID 3 (ID-D3) | NEW PKI DATA 3 |
| PREVIOUS ID 3 (ID-A3) | | | | |

• • •

THE SAME ID COULD BE USED
FOR DIFFERENT TYPES

| CustID | NEW PKIType ID n | DEVICE ID 1 (ID-C1) | NEW ID 1 (ID-DX) | NEW PKI DATA X |
|---|---|---|---|---|
| PREVIOUS ID 1 (ID-A1) | | DEVICE ID 2 (ID-C2) | NEW ID 2 (ID-DY) | NEW PKI DATA Y |
| PREVIOUS ID 2 (ID-A2) | | DEVICE ID 3 (ID-C3) | NEW ID 3 (ID-DZ) | NEW PKI DATA Z |
| PREVIOUS ID 3 (ID-A3) | | | | |

*FIG. 3D*

AFTER BINDING WITH NEW PKI DATA

| | | ID-B | ID-C |

| CustID | NEW PKIType ID 1 |
|---|---|
| UNSPECIFIED | DEVICE ID 1 | NEW PKI DATA 1 |
| UNSPECIFIED | DEVICE ID 2 | NEW PKI DATA 2 |
| UNSPECIFIED | DEVICE ID 3 | NEW PKI DATA 3 |

- 
- 
-

THE SAME ID COULD BE USED FOR DIFFERENT TYPES

DEVICE ID IS LINKED TO CERTIFICATE OF THE NEW PKI DATA

| CustID | NEW PKIType ID n |
|---|---|
| NULL | DEVICE ID X | NEW PKI DATA X |
| NULL | DEVICE ID Y | NEW PKI DATA Y |
| NULL | DEVICE ID Z | NEW PKI DATA Z |

*FIG. 4B*

AFTER BINDING WITH NEW PKI DATA

| CustID | NEW PKIType ID 1 |
|---|---|
| PREVIOUS ID 1 (ID-A1) | NEW ID 1 → NEW PKI DATA 1 |
| PREVIOUS ID 2 (ID-A2) | NEW ID 2 → NEW PKI DATA 2 |
| PREVIOUS ID 3 (ID-A3) | NEW ID 3 → NEW PKI DATA 3 |

[ID-A] [ID-B] [ID-C] [ID-D]

NEW ID COULD BE THE SAME AS THE PREVIOUS ID

THE SAME ID COULD BE USED FOR DIFFERENT TYPES

NEW ID IS LINKED TO THE CERTIFICATE OF THE NEW PKI DATA

| CustID | NEW PKIType ID n |
|---|---|
| PREVIOUS ID 1 (ID-A1) | NEW ID X → NEW PKI DATA X |
| PREVIOUS ID 2 (ID-A2) | NEW ID Y → NEW PKI DATA Y |
| PREVIOUS ID 3 (ID-A3) | NEW ID Z → NEW PKI DATA Z |

*FIG. 4D*

CROSS-DOMAIN IDENTITY MANAGEMENT FOR A WHITELIST-BASED ONLINE SECURE DEVICE PROVISIONING FRAMEWORK

RELATED APPLICATIONS

This application claims priority from U.S. provisional application No. 61/324,571, filed Apr. 15, 2010, which is incorporated by reference herein in its entirety.

This application is related to co-pending U.S. application Ser. No. 12/961,455 filed on Dec. 6, 2010, entitled "Online Public Key Infrastructure (PKI) System." This application is also related to co-pending U.S. application Ser. No. 13/087,847, filed Apr. 15, 2011, entitled "Online Secure Device Provisioning Framework."

BACKGROUND

Digital information has become extremely important in all aspects of commerce, education, government, entertainment and management. In many of these applications, the ability to ensure the privacy, integrity and authenticity of the information is critical. As a result, several digital security mechanisms have been developed to improve security.

One standardized approach to today's digital security is referred to as the Public Key Infrastructure (PKI). PKI provides for use of digital certificates to authenticate the identity of a certificate holder, or to authenticate other information A certificate authority (CA) issues a certificate to a certificate holder and the holder can then provide the certificate to a third party as an attestation by the CA that the holder who is named in the certificate is in fact the person, entity, machine, email address user, etc., that is set forth in the certificate. And that a public key in the certificate is, in fact, the holder's public key. People, devices, processes or other entities dealing with the certificate holder can rely upon the certificate in accordance with the CA's certification practice statement.

A certificate is typically created by the CA digitally signing, with its own private key, identifying information submitted to the CA along with the public key of the holder who seeks the certificate. A certificate usually has a limited period of validity, and can be revoked earlier in the event of compromise of the corresponding private key of the certificate holder, or other revocable event. Typically, a PKI certificate includes a collection of information to which a digital signature is attached. A CA that a community of certificate users trusts attaches its digital signature and issues the certificates to various users and/or devices within a system.

Network-enabled devices are generally provisioned at the factory with identity data so that they may communicate with other network-enabled devices in a secure manner using an identity data system. The identity data typically includes a public and private key pair and a digital certificate. Illustrative examples of networked-enabled device include, without limitation, PCs, mobile phones, routers, media players, set-top boxes and the like.

The identity data may be provisioned in network-enabled devices before or after they are deployed in the field For instance, the identity data may be incorporated into the device at the time of manufacture. For example, a large scale upgrade may occur when a network operator wants to replace their Digital Rights Management (DRM) system or when they want to support other security applications that require the network-enabled devices to be provisioned with new types of identity after the devices have been deployed. This can be a difficult and cumbersome process because it is often performed manually and therefore can require the devices to be returned to a service center.

SUMMARY

In accordance with one aspect of the invention, a method for managing identifiers associated with network-enabled devices and used in an identity data system provisioning the network-enabled devices with identity data is provided. The method includes receiving a first set data that includes a previously assigned identifier for one or more of the network-enabled devices that are authorized to be provisioned with new identity data. If identity data is currently installed on the one or more network-enabled devices, each of the previously assigned identifiers in the first set of data is associated with a corresponding identifier linked to the identity data currently installed on the one or more network-enabled devices to establish a second set of data. New identity data is bound to each of the one or more network-enabled devices by assigning a new identifier linked with the new identity data to each of the one or more network-enabled devices to establish a whitelist. The whitelist specifies, for each of the one or more network-enabled devices, its previously assigned identifier, its corresponding identifier and its new identifier that is linked with the new identity data.

In accordance with another aspect of the invention, a method is provided for updating network-enabled devices with new identity data. Each of said network-enabled devices has at least three types of identifiers associated therewith. The method includes receiving over a communications network a request for new identity data for a plurality of network-enabled devices. Each of the requests includes an identifier of the third-type associated with the network-enabled devices. An identifier of the first type associated with the network-enabled devices is obtained. The first identifier type is an identifier that is included in identity data with which the network-enabled device is currently provisioned. The network-enabled devices have previously been provisioned with identifiers of the first type by respectively assigning the identifiers of the first type to network-enabled devices that are already identified by identifiers of the second type. New identity data assigned with new identifiers of the first type is received. Each of the new identifiers is matched with a corresponding identifier of the third type. The new identity data assigned with the new identifiers is delivered over the communications network to respective ones of the network-enabled devices in accordance with their respective third identifiers.

In accordance with yet another aspect of the invention, a server is provided for use in an identity data system that provisions network-enabled devices with identity data. The server includes a whitelist parser and correlator configured to receive a first set of data specifying one or more of the network-enabled devices that are authorized to be provisioned with new identity data. The one or more network-enabled devices are identified in the first set of data by identifiers of a third type. The whitelist parser and correlator is also configured to access one or more databases to retrieve identifiers of a first and second type each of which also identify the one or more network-enabled devices. The identifiers of the first type are linked to identity data currently provisioned in the network-enabled devices. The whitelist parser and correlator is further configured to correlate the identifiers of the third type with corresponding identifiers of the first and second type to establish a whitelist that identifies the network-enabled devices that are authorized to be provisioned by their respective identifiers of the first type and at least one additional identifier to be linked to new identity data to be provisioned in the one or more network-enabled devices. The server also includes a configuration manager to specify a whitelist format, assign different types of identity data to the network-enabled devices and associate the different types of identity data with network operators who deploy the network-enabled devices.

BRIEF DESCRIPTION OF THE DRAWINGS

FIGS. 1A and 1B show one example of an operating environment in which the processes described herein for provisioning network-enabled devices with identity data may be implemented.

FIG. 2 shows one example of a generic whitelist that may be used for both online and offline binding.

FIGS. 3A-3D show examples of whitelists that may be employed when authentication, authorization and device binding is performed online at the update server.

FIGS. 4A-4D show examples of whitelists that may be employed when authorization and device binding are performed during the new PKI identity generation process.

DETAILED DESCRIPTION

An identity data management system is described herein which provides a flexible framework that can be used to upgrade, renew, or supplement identity data that is provisioned in a large base of network-enabled devices that have already been deployed in the field. The system architecture allows network operators to install and update the identity data in these devices without having to recall them from the end-user. The system architecture may also allow operators to update expired or expiring digital certificates provisioned in previously deployed network-enabled devices with minimum service disruption. In a common scenario, for instance, a service provider may have acquired, say, 500,000 units of a product that they have delivered to their end user customers. For one reason or another the service provider may wish to update the identity data in all or a subset (e.g., 100,000) of those units. In one particular instance the identity data is PKI data. In other cases the identity data may take a variety of other forms such as a serial number, a symmetric key that is cryptographic based, and the like. For purposes of illustration only and not as a limitation on the invention the following description will often refer to a PKI management system that is used to upgrade, renew, or supplement PKI data.

Figure 1B:
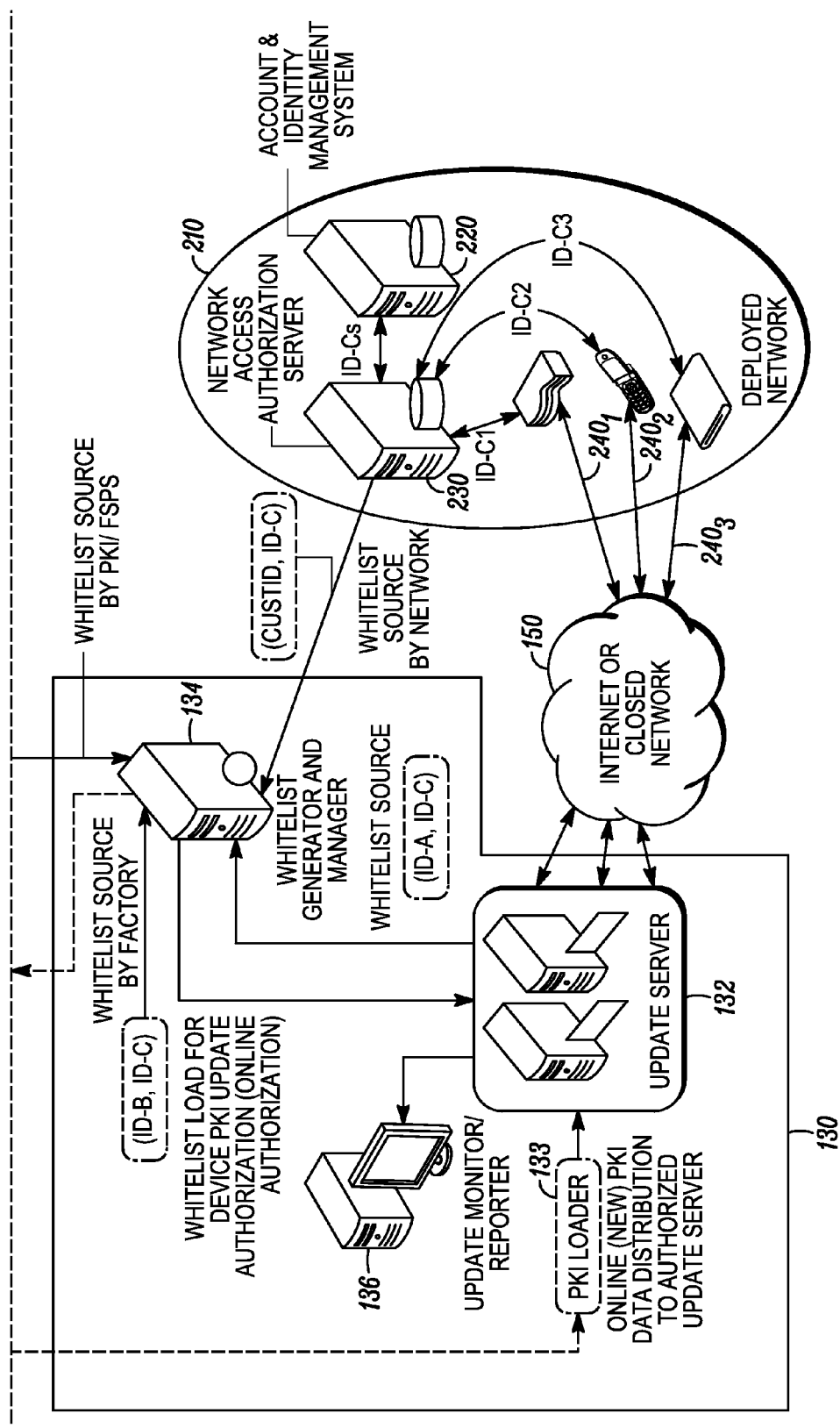

FIGS. 1A and 1B show one example of an operating environment in which the processes described herein for provisioning network-enabled devices with identity data may be implemented. This example shows a number of different domains representative of the different parties that may be involved in the data identity provisioning/update process. In this example three domains are shown: a factory domain 310 representing a manufacturing site for network-enabled devices; a deployed network domain 210 controlled by a network coordinator that operates the network in which the network-enabled devices are used; and a PKI/identity management system domain 120 operated by a PKI center operator. Although in general these domains may be maintained operated by the different entities, in some cases they may be operated by the same entities. For instance, the factory domain 310 and the PKI/identity management system domain 120 are sometimes under the control of the same entity.

It should be understood that each domain in FIGS. 1A and 1B is shown in a highly simplified manner in which a single entity (e.g., server, database, etc) may be representative of more complex arrangements and systems. For instance, as explained below, the factory domain includes a factory database 330 which is used to track components used in the manufacturing process, purchase and shipping orders, and so on. In reality, there may be many different systems and entities involved in this process, all of which are represented herein by factory database 330.

The manufacturing domain 310 of a single manufacturer may include multiple manufacturing sites which in some cases can be operated by a third party contract manufacturer distributed world-wide. Each factory, only one of which is illustrated in FIGS. 1A AND 1B, may produce a single type or single class of network-enabled devices (e.g., mobile phones) or multiple classes of devices (e.g., mobile phones, routers and set-top boxes). FIGS. 1A AND 1B shows one illustrative manufacturing site, factory 310, which includes the aforementioned local factory database 330, factory programming stations 350 that allow factory personnel to access the factory database and the network-enabled devices $340_1$, $340_2$, and $340_3$ ("340") being produced, and factory servers 320 that are used to communicate with the PKI system 120 and store the PKI identity data received therefrom.

The network 210 includes a network access authorization server 230, which grants permission to the deployed network-enabled devices $240_1$, $240_2$, and $240_3$ ("240") to access the network and initiate upgrade operations. Identity data and other information concerning the deployed devices 240 are maintained by an account identity and management system 220.

In addition to the identity management components located at the factory site 310 discussed above, the PKI/identity management system includes two primary sub-systems: a PKI/identity generation system 120 and a PKI/identity update system 130. The PKI/identity generation system 120, which for security reasons is often an offline system, includes order fulfillment processors 122, which generate digital certificates or other identity data requested for products. The order fulfillment processors 122 may include, or have access to, hardware security modules (HSMs) in which the CA's certificate signing private keys and secure data may be stored for use by the system. The PKI/identity generation system 120 also includes an archive database 124, which is a database of records. These records may pertain to issued digital certificates, original requests for new digital certificates or secure data, audit data, organization information, product configurations, user information, and other record types as necessary.

The PKI/identity update system 130 includes a PKI/identity update server 132 that receives new identity data from the offline PKI/identity generation system 120 and securely downloads the new identity data to the appropriate deployed network-enabled devices 240. The PKI/identity update system 130 also includes a whitelist generation and manager (WGM) server 134 for consolidating various identifies received from different whitelist sources maintained within the various domains, i.e., the PKI/identity generation domain, the device manufacturer domain and the service provider/network operator domain. In particular, WGM server 134 receives one set of device identifiers from the factory via a centralized unit personalization database 360, which has all the data retrieved from different manufacturing sites and another set of device identifiers, one of which is assigned by the PKI/identity generation system 120, from centralized PKI personalization database 160. Other sources of whitelist data, either from network operators or update servers 132, will be discussed below. These identifiers and other data allow the WGM server 134 to correlate the various identifiers that are assigned to same network-enabled device.

Before presenting in detail the process flow among the various domains and entities shown in FIGS. 1A and 1B, a high-level overview of the secure device provisioning process will be presented. At the outset, it should be noted that different domains may assign its own identifier which are to be associated with the network enabled devices, and these identities need to be tracked and correlated with one another in order to perform a PKI/identity update. In particular, the PKI center coordinator assigns an identifier, referred to herein as ID-A, to each PKI/identity data unit that will ultimately be provisioned in a network-enabled device at the factory. If an identity data unit includes a public-private key pair and a digital certificate, its ID-A will be included in the certificate. Likewise, the manufacturer assigns an identifier, denoted ID-B to each device 340 it manufactures. This identifier will often be in the form of a hardware-based identifier such as a MAC Address, an International Mobile Equipment Identity Number (IMEI) or a unit ID (UID), for example. In addition, the manufacturer may also assign another identifier, denoted ID-C, which may be in the form of a label such as a serial number or the like Unlike the other identifiers, the label will often be visible on the device itself. In part for this reason, the network operator will generally use the identifier ID-C within its own domain. In some cases the identifiers ID-B and ID-C may be the same.

When a network-enabled device is first provisioned with identity data, the PKI/identity generation system 120 generates the initial identity data for each device and delivers it to the factory servers 320. Each identity data unit that is provided to the factory servers 320 includes its identifier ID-A. When the manufacturer is ready to first load a newly manufactured device with identity data, the factory stations 350 will request an identity data unit by providing the factory servers 320 with the device's identifier ID-B. In response, the factory servers 320 will provide the factory stations 350 with an identity data record identified by its identifier ID-A. Both of these identifiers will be stored in the factory servers 320 and replicated to a centralized identity database 160, which associates both identifiers with one another to indicate that they relate to the same network-enabled device 340.

When an already deployed device 240 makes a request that requires it to be provisioned with a new identity data unit, the network operator approves the request in accordance with its own internal procedures. In some cases permission to fulfill the request may be granted by the authorization server 230, which may provide a whitelist specifying those devices to be updated to the WGM server 134 associated with the PKI/identity update system 130. Instead of using an authorization server 230 to deliver the whitelist, the network operator may manually deliver the whitelist to the WGM server 134 over an online interface or the like.

Instead of coming from the network operator, in some cases the authorization may come from the factory, particularly when all the devices deployed to a particular network operator are to be upgraded. This authorization may be based, for instance, on a list of all devices shipped to the network operator. The whitelist that is provided includes the identifier used by the network operator, ID-C, for each device that is to be updated. The WGM server 134 obtains the identifiers ID-A, ID-B and ID-C from the various sources and joins them together into a single whitelist for subsequent distribution to the update server 132 and/or to the PKI/identity generation system 120. If the new identity data to be generated is based on/linked to the identifiers ID-A and/or ID-C, it should be protected by the key/certificate previously provisioned in the devices at the factory. In this case the whitelist is delivered from the WGM server 134 to the PKI/identity generation system 120, from which the previous IDs/keys/certificates can be retrieved to protect the new identity data that is generated. If, on the other hand, the new identity data to be generated is based on a new ID (ID-D) that is not associated with a previously generated/provisioned key/certificate, the PKI/identity generation system 120 generates the new identity data before update requests are received and thus does not need this information from the WGM server 134. In this case, the whitelist is directly sent to the update server 132 so that it can be used to check on the device authorization for the update.

Next, the devices 240 to be updated each send a request to the update server 132. The request is signed with a PKI key (or other types of keys such as symmetric keys and/or identifiers) previously installed at the factory. The PKI data-based mechanism provides a strong authentication of the request message, while a simple identity and/or symmetric key based mechanism provides for easy validation of authentication. The update server 132 first authenticates the device request message by validating its signature and certificate(s). Any invalid request will be rejected.

Using the appropriate identifier ID-C for each device 240 requesting an update, the PKI/identity update server 132 can perform the authorization check based on the whitelist it receives to ensure that only authorized devices are updated with the new PKI/identity data. The update server 132 also obtains the updated PKI identity data records from the PKI/identity generation system 120. The new PKI identity data records are specified by new identifiers ID-D, which may or may not be based on any of the previous identifiers (ID-A, ID-B, and ID-C). The association of the new and previous PKI/identity data determines how the authorization operation is conducted.

In one case, the new PKI/identity data (IDs and keys) are not related to the previous IDs/keys/certificates. In this case the PKI/identity generation system generates a sufficient pool of new PKI data with internally assigned new identifiers and uploads them to the update server 132 for use. The update server 132 simply checks whether or not a device ID (ID-C) in a request message is included in the whitelist. Each request message will be fulfilled with the next available new or unused PKI/identity data record stored in the update server 132. In general, one record will be used for one device, although it is possible that in some cases the same record could be shared among multiple devices. In this process, the update server 132 will pair the device ID-C with a new PKI/identity data record having the identifier ID-D. This online authorization and device binding process is used to ensure that all devices that are authorized to be upgraded will receive the new PKI/identity data.

On the other hand, if the new PKI/identity data (IDs and keys) are related to the previous IDs/keys/certificates, an offline generation and device binding process may be employed. In this case, the PKI/identity generator system 120 only generates the new IDs/keys/certificates for those devices whose IDs (ID-C) are included on the whitelist. The new identity data is then delivered to the update server 132. The update server 132 only has the new PKI/identity data for devices whose IDs (ID-Cs) are on the whitelist; any requests from devices having ID-Cs that are not on the whitelist will not be fulfilled. Finally, the new identity data records are delivered by the update server 132 to their respective devices 240 over a public or private network 150 such as the Internet, for example.

The WGM 134 employs a whitelist-based approach to consolidate the various IDs received and to address any conflict in the process of resolving the above issues. In particular, the WGM 134 manages the various identifiers used by different entities and correlates the different whitelist sources from the factories, the PKI management system and the network operator's access authorization servers as well as the update server 132. This is accomplished by cross indexing the identifiers to create a master database for the subsequent generation of specific whitelists that are tailored for a particular network/customer or application. The WGM 134 also manages the associations among the various IDs and their relationships with their respective PKI/Identity data records which are used for different purposes, including online update request authentication, authorization, new identity protection, and so on. If conflicts arise as a result of information received from either of the three identity data sources or as a result of information stored in update server 132 transaction logs, the WGM 134 detects and resolves them.

For purposes of clarity, the following discussion will refer to PKI data instead of more generally to identity data. However, in all cases any of the other aforementioned types of identity data may be used instead of PKI data.

As mentioned above, a whitelist generated by the WGM 134 provides control over online authentication of update requests, online authorization of the PKI use by a specific device (binding a PKI data with a device online), and offline authorization of the PKI generation for a specific device (binding a PKI data with a device offline).

A PKI update request message received by the update server 132 will be authenticated before an authorization check is performed. Any request that fails the authentication check, which uses the device key/certificate previously loaded at the factory, will be rejected by the update server 132. A whitelist needs to include an identifier (e.g. ID-A) that is linked to the previous key/certificate installed at factory. The device uses the device key to sign the PKI update request message and the update server 132 uses the device public key/certificate to verify the request message. In addition, the previous key/certificate could be used to encrypt the new PKI identity data to protect online delivery of new PKI identity data.

The binding between PKI data and device identifiers can be accomplished in two different ways, each of which may require different information to be included in the whitelist. In one approach, the binding between a particular device and new PKI data is performed on the update server 132 when it receives a request. The new PKI data is generated and delivered to the update server 132 before a request is received. When a request for new PKI data is received by the update server 132 from a device 240 over network 150, the update server 132 selects the next available new PKI data record and binds it to the requesting device 240. Accordingly, when binding is performed online, the new PKI data is generated without knowledge of the particular device to which it will be bound.

In the second approach, the binding between the new PKI data and the device identifiers is performed during the new PKI data generation process based on a whitelist before update requests are received. The PKI generation system is often put offline for security reasons. The PKI data is generated with advance knowledge of the particular device to which it will be bound.

FIG. 2 shows one example of a generic whitelist 400 that may be used for both online and offline binding. The whitelist includes a number of fields that are to be populated by data, including a CustID, New PKI Type ID, Previous PKI Type ID, Previous ID and Device ID. The CustID specifies the identifier of the network operator deploying the list of network-enabled devices from which a request for new PKI data is received. The New PKI Type ID (1, . . . , n) specifies the identifier or identifiers for the type or types of service for which the PKI data is being requested. If the device is to be provisioned for n services, then the whitelist may include n New PKI Type IDs. The Previous PKI Type ID specifies the service type that is associated with a device's previous PKI data. The value of the Previous PKI Type ID may be listed as "unspecified" for devices without any previous PKI-based identity. The Previous ID specifies the original identifier that was assigned to a deployed device by the PKI management system at the factory. In terms of the notation employed above, this identifier is denoted ID-A and is associated with the previous PKI type and data. The Device ID specifies the identifier of the device that is used by the network operator to identify a deployed device. As explained below, depending on whether the binding is performed offline or online as well as other particulars of the use case, the Device ID could be any of the previously used IDs (ID-A, ID-B, ID-C, or unspecified). If an "unspecified" value is used, the new PKI identity data is not linked to any previously used IDs (ID-A, ID-B, ID-C). A new identifier (ID-D) could be used for new PKI identity generation.

Figure 3C:
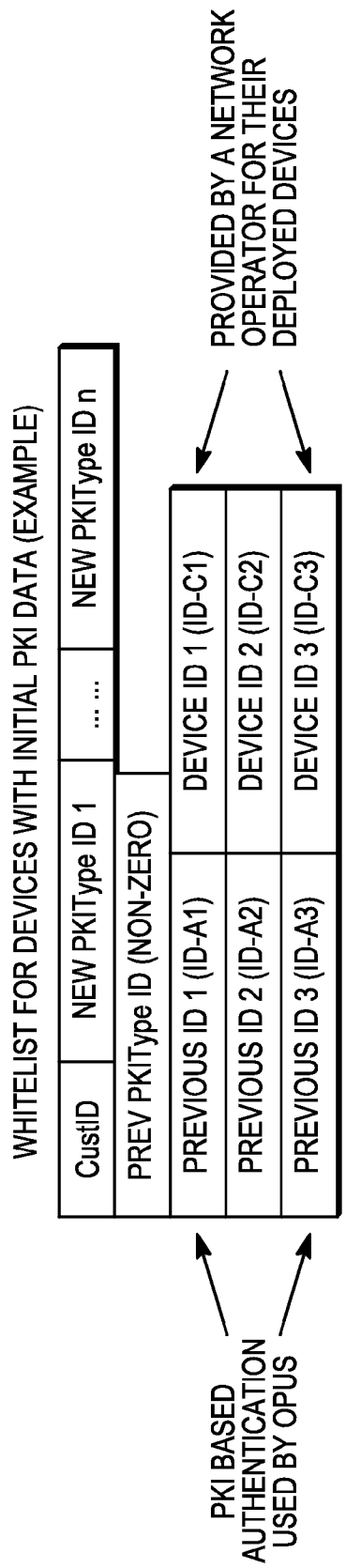

FIG. 3 shows examples of whitelists that may be employed when authentication, authorization and device binding is performed online at the update server 132. FIGS. 3a-3b show the whitelists that may be used when the requesting devices have not been previously provisioned with PKI data and FIGS. 3c-3d show whitelists that may be used when the requesting devices have previously been provisioned with PKI data.

FIG. 3a shows the whitelist for three devices 1, 2 and 3 without previous PKI data when binding is performed online at the update server 132. As shown, the previous ID is unspecified since there no previous PKI identity data was loaded at the factory. The Device ID is the network operator's identifier ID-C. FIG. 3b shows the whitelist after the devices are bound to the new PKI data. In this example each of the devices 1, 2 and 3 are to be provisioned with PKI data records for New PKI Types ID1, ID2, . . . IDN. As shown, since the New PKI data has been generated without knowledge of the device to which it will be bound, the New PKI data for each device is linked to a new identifier denoted New ID ID-D, which is internally assigned by the PKI generation system 120. It should be noted that the New ID identifier ID-D may linked to the PKI data for a single PKI Type or multiple PKI Types. That is, in FIG. 3b, the identifiers ID-D1, ID-D2 and ID-D3 (associated with New PKI Type ID1) may or may not be the same as the identifiers ID-DX, ID-DY and ID-DZ (associated with New PKI Type IDn), respectively.

FIG. 3c shows the whitelist for three devices 1, 2 and 3 that have previously been provisioned with PKI identity data when binding is performed online at the update server 132. As shown, the Device ID is identifier ID-C and the Previous ID is now the identifier ID-A which is linked to the previous PKI identity data loaded at factory. FIG. 3d shows the whitelist after the devices are bound to the new PKI identity data. As in FIG. 3b, each of the devices 1, 2 and 3 in FIG. 3d are to be provisioned with PKI data records for New PKI Types ID1, ID2, . . . IDN. Additionally, also as in FIG. 3b, since the New PKI data has been generated without knowledge of the device to which it will be bound, the New PKI data for each device is linked to a new identifier denoted New ID ID-D, which is internally assigned by the PKI/Identity generation system 120. Similar to FIG. 3b, the New ID identifier ID-D may be linked to the PKI data for a single PKI Type or multiple PKI Types. That is, in FIG. 3d, the identifiers ID-D1, ID-D2 and ID-D3 (associated with New PKI Type ID1) may or may not be the same as the identifiers ID-DX, ID-DY and ID-DZ (associated with New PKI Type IDn), respectively.

Figure 4A:
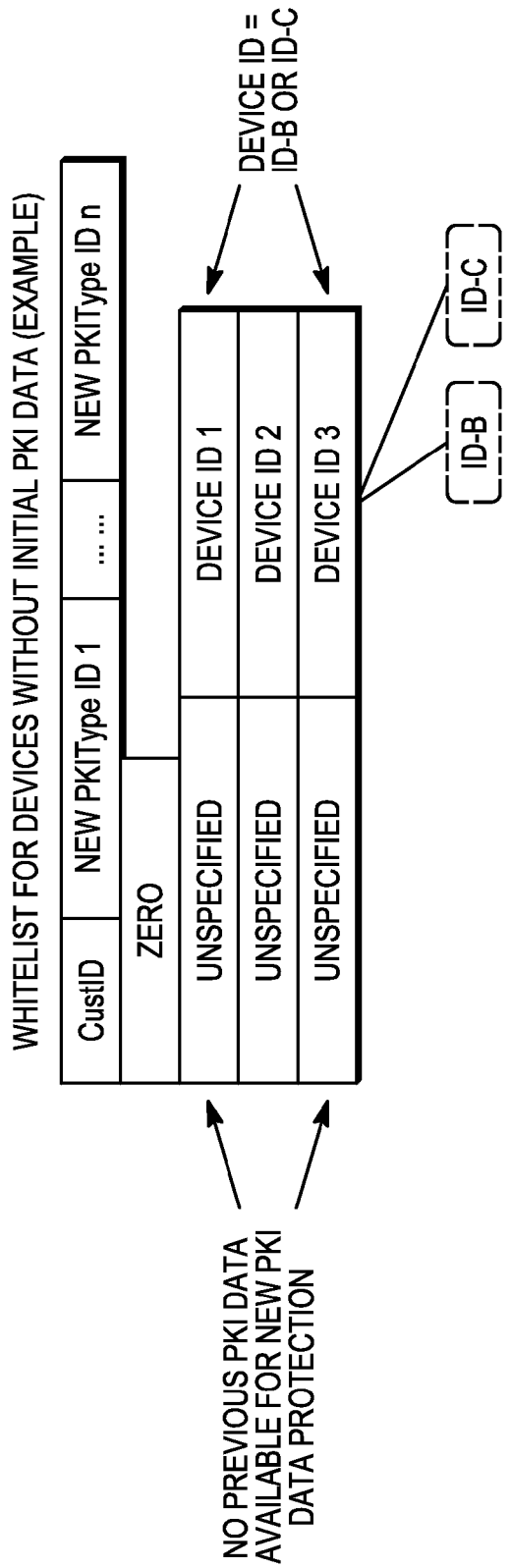
Figure 4C:
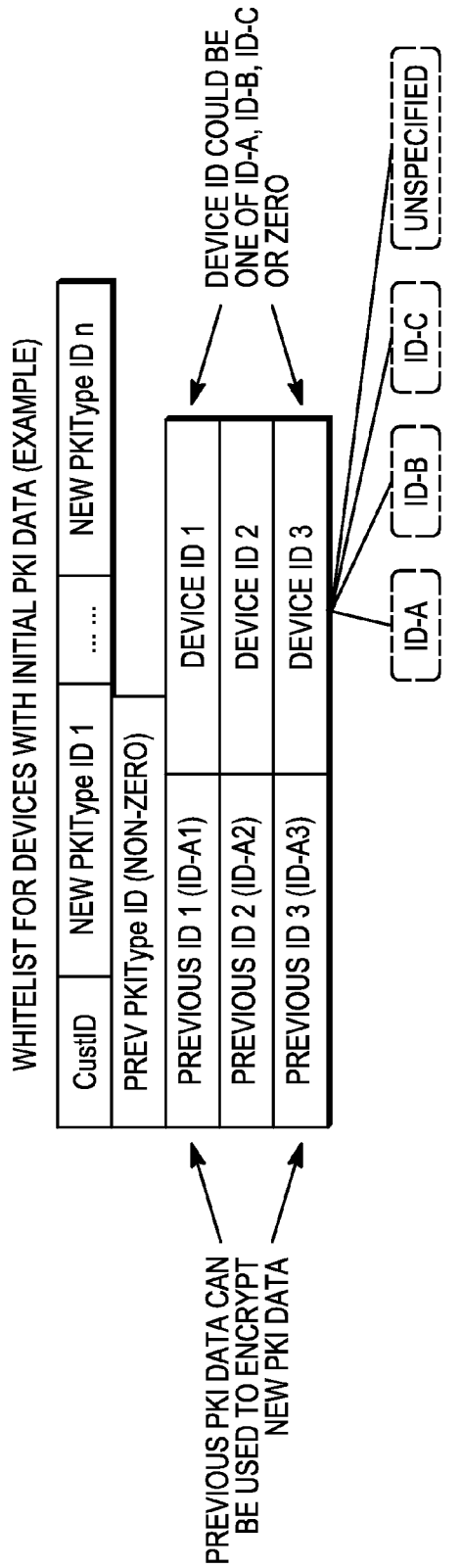

FIG. 4 shows examples of whitelists that may be employed when authorization and device binding are performed during the new PKI identity generation process. FIGS. 4a-4b show the whitelists that may be used when the requesting devices have not been previously provisioned with PKI data and FIGS. 4c-4d shows whitelists that may be used when the requesting devices have previously been provisioned with PKI data.

FIG. 4a shows the whitelist for three devices 1, 2 and 3 that do not have any previous PKI data when new PKI data and device ID binding is performed at the PKI/identity generation system 120. As shown, the previous ID is unspecified since no PKI identity data was loaded at factory. The Device ID used by new PKI identity data may be either of the previously assigned identifiers ID-B or ID-C (e.g., Device ID-1 may be ID-B1 or ID-C1, Device ID-2 may be ID-B2 or ID-C2 and Device ID-3 may be ID-B3 or ID-C3). FIG. 4b shows the whitelist after the devices are bound to the new PKI data. In this example each of the devices 1, 2 and 3 are to be provisioned with PKI data records for New PKI Types ID1, ID2, . . . IDN. As shown, since the New PKI data has been generated for specific devices, the New PKI data for each device is linked to one of its previously assigned identifiers ID-B or ID-C. As before, the Device ID (ID-B or ID-C) may linked to the new PKI data for a single PKI Type or multiple PKI Types. That is, in FIG. 4b, the identifiers ID-1, ID-2 and ID-3 (associated with New PKI Type ID1) may or may not be the same as the identifiers ID X, ID Y and ID Z (associated with New PKI Type IDn), respectively.

FIG. 4c shows the whitelist for three devices 1, 2 and 3 that have been previously provisioned with PKI data when binding is performed at the PKI/identity generation system 120. The Previous ID may be the identifier ID-A that is linked to the previous PKI identity data. FIG. 4d shows the whitelist after the devices are bound to the new PKI data. As shown, the Device ID, denoted New ID1, New ID2 and New ID3 may be any of the identifiers already assigned to the device, ID-A, ID-B, ID-C or a newly assigned identifier ID-D. As in FIG. 4b, each of the devices 1, 2 and 3 in FIG. 4c are to be provisioned with PKI data records for New PKI Types ID1, ID2, . . . IDN. Additionally, also as in FIG. 4b, since the New PKI data has been generated for a particular device, the New PKI data for each device is linked to one of the identifiers ID-A, ID-B ID-C or the newly assigned identifier denoted New ID ID-D, which is internally assigned by the PKI generation system 120. Similar to FIG. 4b, the New ID identifier may be linked to the PKI data for a single PKI Type or multiple PKI Types. That is, in FIG. 4d, the New identifiers ID-1, ID-2 and ID-3 (associated with New PKI Type ID1) may or may not be the same as the identifiers ID X, ID Y and ID Z (associated with New PKI Type IDn), respectively.

Figure 5A:
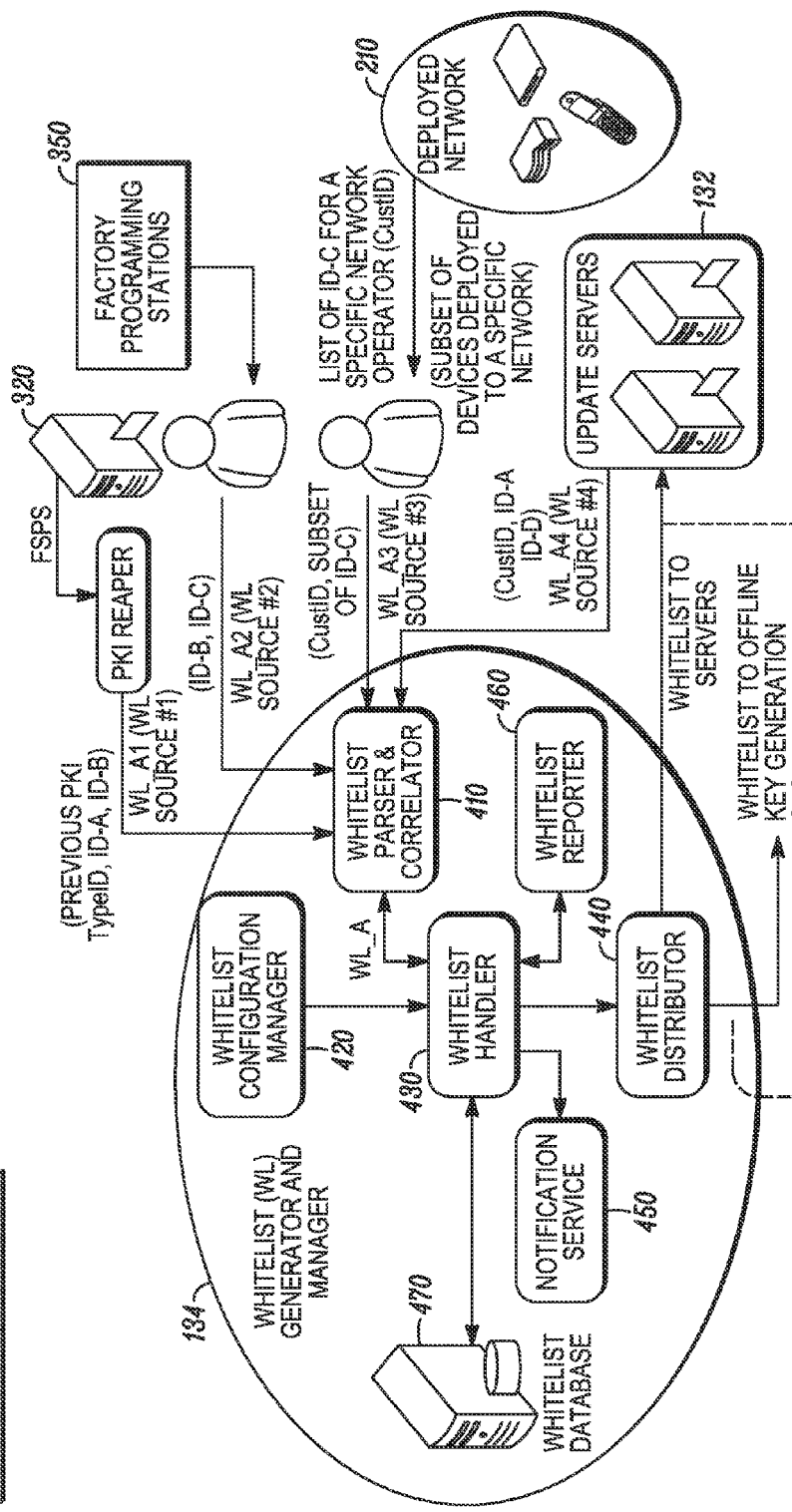
FIGS. 5A and 5B show the logical components of one example of a whitelist generator and manager (WGM) that may be employed in the PKI/Identity update system shown in FIG. 1.
Figure 5B:
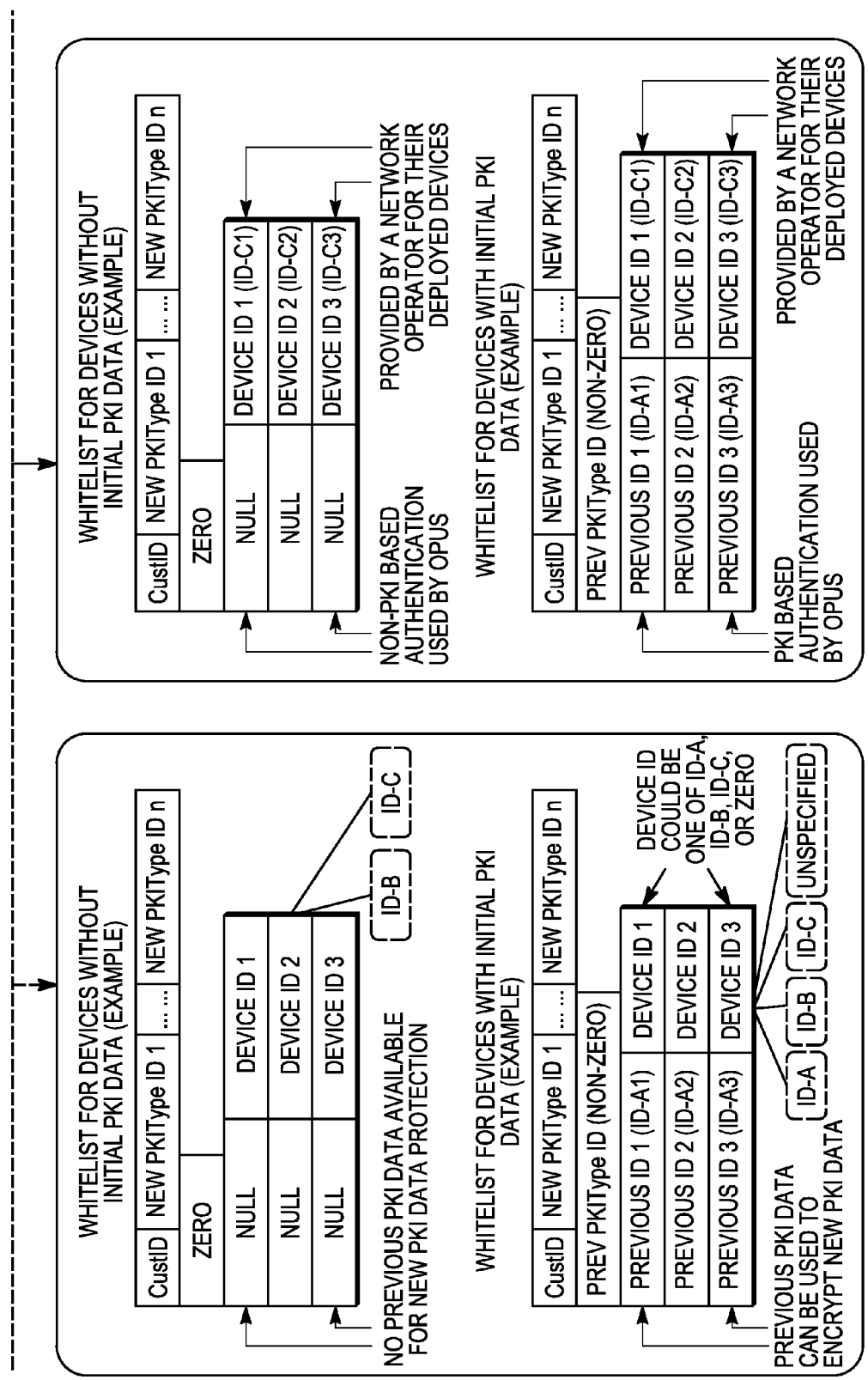

FIGS. 5A and 5B show the logical components of one example of the WGM 134. In this example WGM 134 includes a whitelist parser and correlator 410, whitelist configuration manager 420, whitelist handler 430, whitelist distributor module 440, notification service module 450 and a whitelist reporter module 460.

The whitelist parser and correlator 410 receives and parses the individual sets of data or files from the various sources. It also extracts and correlates the identifiers to generate whitelists such as shown in FIGS. 3 and 4. The whitelist parser and correlator 410 may also allow authorized users to edit pending whitelists. The identifiers from the possible whitelist sources may include, for example, any of the following:

a. Identifiers from the PKI generation system 120 and the factory servers 320. In this case the identifier ID-A (e.g. the identifier used in initial PKI generation) is paired with a device identifier ID-B (e.g. device serial number) during the manufacturing process for a specific PKI type. The ID pairing information along with the PKI data type information (previous PKI TypeID, ID-A, ID-B) is provided (e.g., uploaded) to the WGM 134.

b. Identifiers from the manufacturing domain: In this case the identifier ID-B (e.g. device serial number) is paired with identifier ID-C (e.g. MAC address) by the factory programming station. The pairing information (ID-B, ID-C) is provided (e.g., uploaded) to the WGM 134.

c. Identifiers from, for example, the network access authorization server associated with the network operator: In this case a subset of the identifiers ID-Cs contains the device identifiers for those devices that are deployed to a specific network. For example, the subset A lists all the identifiers ID-C for devices deployed to network operator A and subset B contains all the identifiers ID-C for devices deployed to network operator B. A customer ID (CustID) is used to identify each of the network operators. The CustID, along with the pairing information (CustID, ID-Cs) is provided (e.g., uploaded) to the whitelist generation and management system. The network operator can also select a subset of its population (a subset of ID-Cs) for controlled upgrades of all the devices in its network.

d. Identifiers from an update server 132: In this case, during the update operation for devices with previous PKI data installed, the update server 132 can receive a PKI update request from a device that is authenticated by a valid device key/certificate, but whose ID is missing from the original whitelist.

The whitelist configuration manager 420 manages the associations among the various identifiers and their respective relationships with the PKI data Illustrative tasks include:

a. Assigning new PKI type(s) to devices which have previously been provisioned with a particular PKI type.

b. Associating the new PKI type(s) with a whitelist for a particular network operator.

c. Managing various identifiers from different systems, including, for example:
      i. Specifying which ID is used for authorization and authentication of PKI update requests. Generally, the same identifier that is linked to previously installed PKI data (e.g., keys/certificates) is also be used to protect the key in the new PKI data.
      ii. Specifying which identifier is used when generating the new PKI data.
      iii. Specifying the relationships among the various identifiers from the different ID data sources.

d. Specifying the configuration of a whitelist, including its format, content, input sources and the format of the information received from those input sources, and so on. Illustrative formats are depicted in FIGS. 3 and 4.

e. Specifying the destination of a whitelist: the offline key generation system or an online update server.
f. Managing whitelist users and their respective roles.
g. Determining how the whitelist handler 430, discussed below, resolves conflicts.

The whitelist handler 430 performs a variety of tasks, including handling whitelist updates, detecting and resolving any conflicts that arise from information received from the different whitelist sources mentioned above, and changing the whitelist status from one state to another (e.g., pending, submitted for PKI data generation, processed, and/or re-opened (for conflict resolution), and closed).

The whitelist distributor module 440 generates a whitelist output file based on the whitelist configuration. It also passes notifications to the notification service module 450 (discussed below) or pushes a whitelist to a particular update server, based on the destination of the whitelist. The whitelist reporter module 460 allows users to view the status of a whitelist being processing and view the history of any whitelist changes.

The notification service module 450 sends email notifications to a system administrator requesting a whitelist to be downloaded and imported into the offline PKI generation system 120 so that new PKI data can be generated. The notification service module 450 also sends email notification to authorized users, advising them of any conflict that is detected in the data received from the different whitelist sources and advising them of changes in whitelist status.

Figure 6:
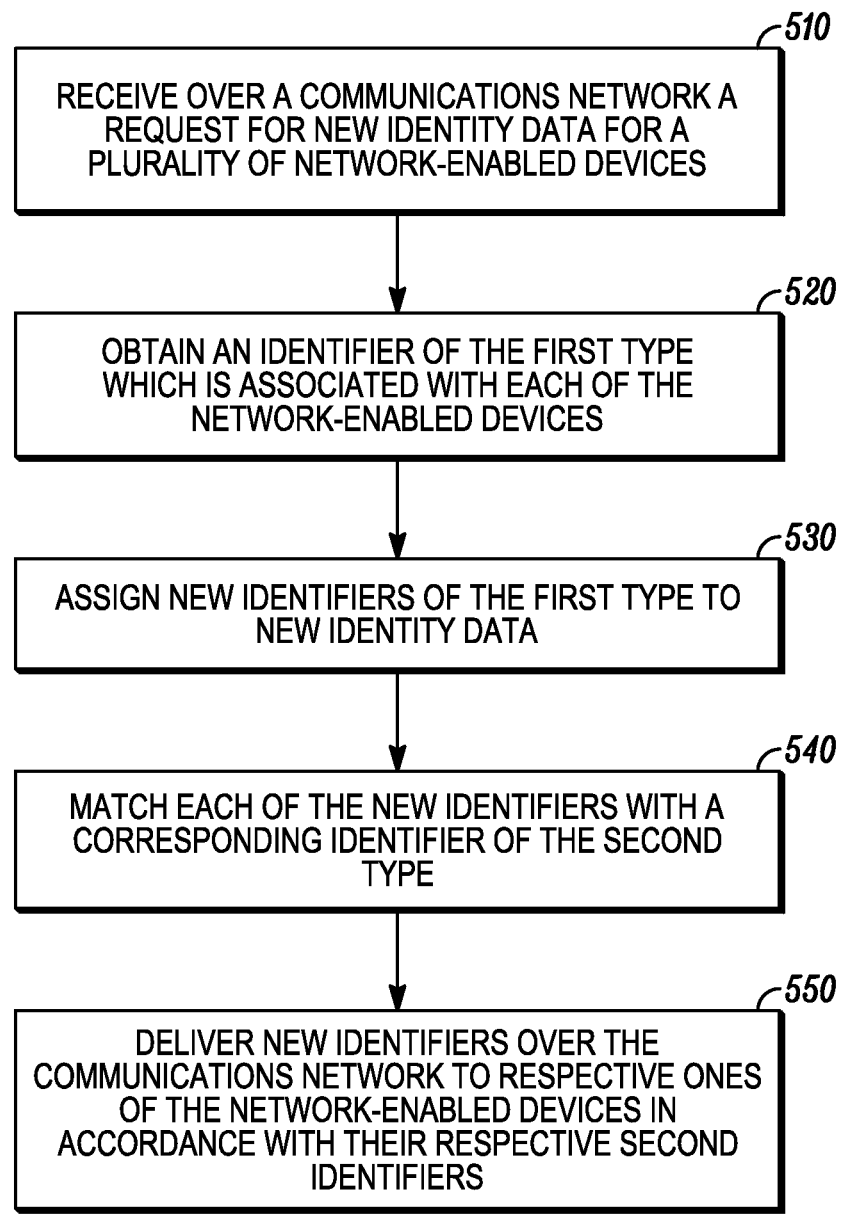
FIG. 6 is a flowchart showing one example of a method for updating network-enabled devices with new identity data.

FIG. 6 is a flowchart showing one example of a method for updating network-enabled devices with new identity data. In this example at least two types of identifiers are associated with each of the network-enabled devices. At step 510, an update server receives over a communications network a request for new identity data for a plurality of network-enabled devices. Each of the requests includes an identifier of the second type which is associated with the network-enabled devices. At step 520, the update server obtains an identifier of the first type which is associated with each of the network-enabled devices. The first identifier type is an identifier that is included in identity data with which the network-enabled device is currently provisioned. The identifiers of the first type have been assigned to respective network-enabled devices that are already identified by identifiers of the second type. New identity data assigned with new identifiers of the first type is received at step 530. Each of the new identifiers is matched with a corresponding identifier of the second type at step 540. At step 550, the new identifiers are delivered over the communications network to respective ones of the network-enabled devices in accordance with their respective second identifiers.

As used in this application, the terms "component," "module," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

The invention claimed is:

1. A method for managing identifiers associated with network-enabled devices and used in an identity data system provisioning the network-enabled devices with identity data, comprising:
   receiving a first set of data that includes a previously assigned identifier for one or more of the network-enables devices that are authorized by a first whitelist to be provisioned with new identity data;
   if identity data currently is installed on the one or more network-enabled devices, associating, by an identity update system, each of the previously assigned identifiers in the first set of data with a corresponding identifier linked to the identity data currently installed on the one or more network-enabled devices to establish a second set of data; and
   binding, by the identity update system, new identity data to each of the one or more network-enable devices by assigning a new identifier linked with the new identity data to each of the one or more network-enabled devices to establish a second whitelist after the one or more network-enabled devices are bound to the new identity data, the second whitelist specifying, for each of the one or more network-enabled devices, its previously assigned identifier, its corresponding identifier and its new identifier that is linked with the new identity data.

2. The method of claim 1 wherein the corresponding identifier is unspecified if identity data is currently not installed on the one or more network-enabled devices.

3. The method of claim 1 wherein the binding is performed online such that the new identity data is generated before it is requested by the one or more network-enabled.

4. The method of claim 1 wherein the binding is performed offline such that the new identity data is generated for particular ones of the network-enabled devices.

5. The method of claim 4 wherein the new identifier is based on a previously assigned identifier.

6. The method of claim 1 wherein the previously assigned identifiers are received from a network operator deploying the network-enabled devices.

7. The method of claim 1 wherein associating, by the identity update system, each of the previously assigned identifiers in the first set of data with a corresponding identifier linked to the identity data currently installed on the one or more network-enabled devices further comprises correlating an additional previously assigned identifier for each of the network-enabled devices authorized to be new with respective ones of the previously assigned identifiers and the corresponding identifiers.

8. The method of claim 7 wherein the previously assigned identifiers are assigned by an identity management system and the additional previously assigned identifiers are assigned by a facility associated with a manufacturer of the network-enabled devices.

9. A method for updating network-enabled devices with new identity data, each of said network-enabled devices having at least three types of identifiers associated therewith, comprising:

receiving, by an identity update system over a communications network a request for new identity data for a plurality of network-enabled devices that are authorized by a first whitelist to be provisioned with new identity data, each of said requests including an identifier of a third type associated with the network-enabled devices;

obtaining, by the identity update system an identifier of a first type associated with the network-enabled devices, said identifier of the first type being an identifier that is included in identity data with which the network-enabled device is currently provisioned, wherein the network-enabled devices have previously been provisioned with identifiers of the first type by respectively assigning the identifiers of the first type to network-enabled devices that are already identified by identifiers of a second type;

receiving, by the identity update system new identity data assigned with new identifiers of the first type, wherein each of the new identifiers is matched with a corresponding identifier of the third type;

storing, at the identity update system, a second whitelist specifying, for each of the network-enabled devices, the identifier of the first type, the identifier of the second type, and the identifier of the third type; and delivering, by the identity update system, over the communications network the new identity data assigned with the new identifiers to respective ones of the network-enabled devices in accordance with their respective third identifiers.

10. The method of claim 9 wherein each of the requests is respectively received from one of the network-enabled devices that is to be provisioned with the new identity data.

11. The method of claim 10 wherein the requests are respectively signed with a cryptographic key previously installed in each respective network-enabled device and further comprising validating the signatures and digital certificates associated therewith before delivering the new identifiers.

12. The method of claim 9 wherein the second identifier is received from a server that maintains the first whitelist of network-enabled devices authorized to be upgraded by a network operator who deployed the network-enabled device.

13. The method of claim 12 wherein the first whitelist identifies the network-enabled devices by their respective identifiers of the third type.

14. The method of claim 13 wherein the first whitelist further identifies the network-enabled devices by their respective identifiers of the second type.

15. The method of claim 9 wherein the newly assigned identity data is generated in an off-line manner.

16. The method of claim 9 wherein identifiers of the first type are assigned by an identity data management system.

17. The method of claim 9 wherein identifiers of the second and third types are assigned by a manufacturer of the networked-enabled devices.

18. The method of claim 9 wherein the identity data newly assigned to each network-enabled device is encrypted by a key previously installed in each respective network-enabled device.

19. The method of claim 9 wherein the identity data includes public key infrastructure (PKI) data.

20. The method of claim 19 wherein the PKI data includes a digital certificate and a private key.

21. At least one non-transitory computer-readable medium encoded with instructions which, when executed by a processor, performs a method for updating network-enabled devices with new identity data, each of said network-enabled devices having at least two types of identifiers associated therewith, comprising:

receiving over a communications network a request for new identity data for a plurality of network-enabled devices that are authorized by a first whitelist to be provisioned with new identity data, each of said requests including a identifier of the second type associated with the network-enabled devices;

obtaining an identifier of the first type associated with the network-enabled devices, said first identifier type being an identifier that is included in identity data with which the network-enabled device is currently provisioned, wherein the network-enabled devices have previously been provisioned with identifiers of the first type by respectively assigning the identifiers of the first type to network-enabled devices that are already identified by identifiers of the second type;

receiving new identity data assigned with new identifiers of the first type, wherein each of the new identifiers is matched with a corresponding identifier of the second type;

storing a second whitelist specifying, for each of the network-enabled devices, the identifier of the first type and the identifier of the second type; and delivering over the communications network the new identity data assigned with the new identifiers to respective ones of the network-enabled devices in accordance with their respective second identifiers.

22. The computer-readable medium of claim 21 wherein the requests are respectively signed with a cryptographic key previously installed in each respective network-enabled device and further comprising validating the signatures and digital certificates associated therewith before delivering the new identifiers.

23. The computer-readable medium of claim 22 wherein the second identifiers are received from a server that maintains a list of network-enabled devices authorized to be upgraded by a network operator who deployed the network-enabled device.

24. The computer-readable medium of claim 21 wherein the new identity data delivered to each network-enabled device is encrypted by a key previously installed in each respective network-enabled device.

25. An apparatus for use in an identity data system provisioning network-enabled devices with identity data, comprising:

a whitelist parser and correlator module configured to (i) receive a first set of data specifying one or more of the network-enabled devices that are authorized by a first whitelist to be provisioned with new identity data, wherein the one or more network-enabled devices are identified in the first set of data by identifiers of a third type, (ii) access one or more databases to retrieve identifiers of a first and second type each of which also identify the one or more network-enabled devices, said identifiers of the first type being linked to identity data currently provisioned in the network-enabled devices and (iii) correlate the identifiers of the third type with corresponding identifiers of the first and second type to establish a second whitelist after the one or more network-enabled devices are provisioned with the new identity data, that identifies the network-enabled devices that are authorized to be provisioned by their respective identifiers of the first type and at least one additional identifier to be linked to new identity data to be provisioned in the one or more network-enabled devices; and a configuration manager module to specify a whitelist format, assign different types of identity data to the network-enabled devices and associate the different types of identity data with network operators who deploy the network-enabled devices.

26. The apparatus of claim 25 further comprising a notification service module configured to notify users of conflicts arising among the sets of data received from different sources and that the master whitelist is ready to be downloaded.

27. The apparatus of claim 25 further comprising a whitelist distributor module configured to provide the whitelist to an update server that delivers the new identity data to the network-enabled devices.

* * * * *